Nov. 21, 1967   F. H. DEILY ETAL   3,353,403
FIELD VISCOSIMETER
Filed May 24, 1965

FREDRIC H. DEILY & *INVENTORS*
GEORGE D. COMBS

BY James E. Reed
*ATTORNEY*

United States Patent Office 3,353,403
Patented Nov. 21, 1967

3,353,403
FIELD VISCOSIMETER
Fredric H. Deily and George D. Combs, Houston, Tex., assignors to Esso Production Research Company, a corporation of Delaware
Filed May 24, 1965, Ser. No. 457,911
5 Claims. (Cl. 73—55)

ABSTRACT OF THE DISCLOSURE

A viscosimeter including elongated capillary entrance and test sections arranged in end-to-end relationship and separated from one another by an enclosed gap less than the internal diameter of the two sections, means for discharging a fluid through the entrance and test sections, and a gauge communicating with the gap for measuring the pressure drop in fluid passing through the test section.

---

Figure 1:
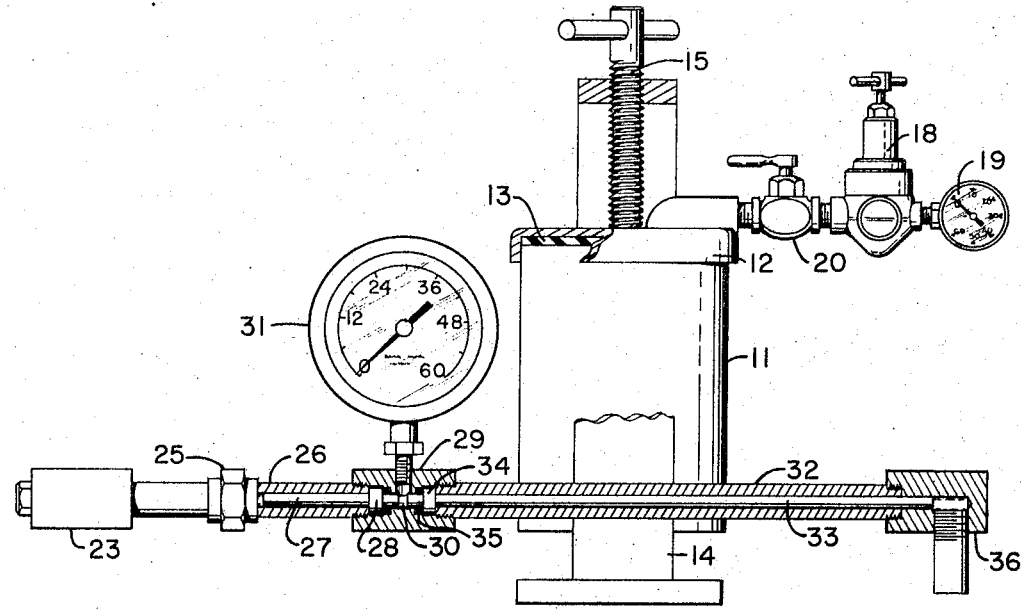

The present invention relates to apparatus for measuring the properties of liquids and is particularly concerned with an improved viscosimeter for determining the viscosities of oilfield drilling muds and similar fluids.

The performance of an oilfield drilling mud depends in part upon effective control of the mud viscosity within the borehole. Viscosity in turn is dictated in part by the type of formation in which the mud is used. Mud employed for drilling through clays, soft shales and similar formations generally accumulates colloidal solids and gradually increases in viscosity. In a gypsum, anhydrite or similar formation, the same mud may lose viscosity due to the agglomeration of colloidal particles. In order to secure acceptable performance, it is therefore necessary to measure the mud viscosity at frequent intervals as the drilling operation progresses. This is normally done in the field by means of a Marsh funnel, a Stormer viscosimeter, or a Fann V-G meter. The values obtained with the Marsh funnel are dependent on the density of the fluid and, because they are obtained at an unknown shear rate, are of only limited value. The Stormer viscosimeter does not permit control of the shear rate for indefinite periods of time and has therefore been largely superseded by the Fann V-G meter. The Fann instrument is a multispeed rotating cylinder viscosimeter which gives the required data at low and intermediate shear rates but is inadequate at relatively high shear rates. None of the conventional devices used in the past for measuring the viscosities of drilling muds and similar fluids in the field is thus wholly satisfactory.

It is therefore an object of the present invention to provide an improved viscosimeter for determining the viscosities of oilfield drilling muds, fracturing fluids and similar non-Newtonian liquids. Another object is to provide a viscosimeter for measuring the viscosities of such liquids at relatively high shear rates representative of those encountered in actual drilling and fracturing operations. A further object is to provide a viscosimeter which is relatively inexpensive, is simple to operate, and is capable of withstanding the rough treatment to which apparatus employed in oilfield operations is normally subjected. Still other objects will become apparent as the invention is described in greater detail hereafter.

The present invention provides an improved viscosimeter for measuring the viscosities of drilling muds, fracturing fluids and other non-Newtonian liquids used in oilfield drilling operations and similar applications. The improved viscosimeter is a capillary tube device which is inexpensive to construct, operate and maintain and includes features that facilitate the accurate measurement of the viscosities of drilling muds and similar non-Newtonian liquids at high shear rates, obviate the necessity for corrections to compensate for entrance effects and kinetic energy, and permit rapid measurements under field conditions by drilling crews without extensive training. The apparatus comprises a closed cell, means for applying pressure to fluid contained in the cell, means for indicating the applied pressure, an elongated capillary tube including an entrance section communicating with the cell and a test section, and means between the entrance and test sections for determining the pressure drop as the fluid passes through the test section of the capillary tube. By measuring the time required for a given volume of fluid to flow from the cell under given conditions and recording the pressure drop which takes place, the apparent viscosity of the fluid and the shear rate can be readily determined. A series of such measurements permits the preparation of a curve showing the shear rate-viscosity relationship.

Figure 2:
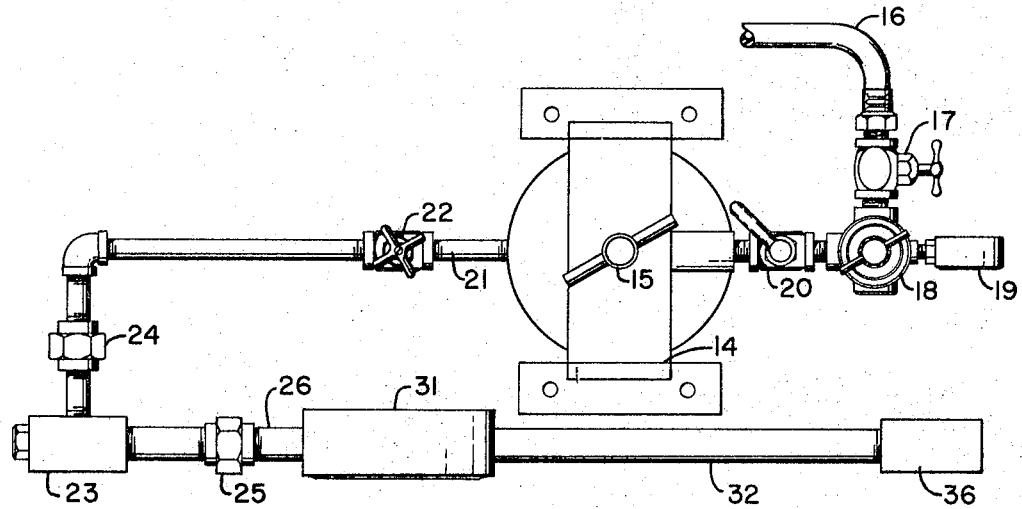

The nature and objects of the invention can best be understood by referring to the following detailed description of the apparatus employed in accordance therewith and to the accompanying drawing in which:

FIGURE 1 is a vertical elevation, partially in section, of one embodiment of the invention; and FIGURE 2 is a top view of the apparatus of FIGURE 1.

The apparatus depicted in the drawing includes a cylindrical cell 11 fitted at its top with a cap 12 containing a gasket 13 of rubber or similar material. The cell is preferably mounted in an upright frame 14 by means of a screw 15 which extends through a threaded hole in the frame and holds the cap in place as shown. Alternatively, the cap may be threaded to the cell. The inside of the cell will generally be about three inches in diameter and about five inches high. The cap includes a hole at one side through which air, nitrogen, natural gas or a similar gaseous pressure medium may be introduced. The gas is fed from a pipe or hose 16 through valve 17 into a spring-loaded, diaphragm-type pressure regulator 18. The regulator is fitted with a pressure gauge 19 for registering the pressure downstream of the regulator. The gas flowing from the regulator passes through bleed-off valve 20 into the cell. This valve, of commercial design, serves as a safety device and will release whenever the pressure reaches 170 pounds per square inch or some other predetermined value.

The lower part of cell 11 contains a threaded hole which serves as the outlet for the cell. The capillary portion of the device is connected to this outlet by means of pipe or conduit 21, valve 22, ell 23, and unions 24 and 25. The capillary tubing employed will normally range between about 0.01 and about 0.1 inch, preferably between about 0.025 and about 0.075 inch, in internal diameter and is contained in pipe of larger size which serves to protect it. The use of stainless steel tubing is preferred. Pipe 26, connected to union 25, contains the entrance tube 27. This tube is held in place by a collar 28 which bears against the end of the pipe and seats against a shoulder in pressure tap 29. An O-ring 30 is interposed between the downstream face of the collar and a second internal shoulder in the pressure tap as shown. Pressure gauge 31 is threaded into a hole in the wall of the tap. A gauge registering from 0 to about 60 lbs. per square inch will generally be satisfactory. Pipe 32 containing test section 33 of the tubing is threaded into the other end of the pressure tap. The test section of the same internal diameter as the entrance section, will normally be between about 8 and about 16 inches in length. It should be straight, free of fittings, and concentric with the entrance section within $1/10$ of a tube diameter. Any curvature in the tubing will cause secondary flow due to centrifugal forces acting on the fluid at high shear rates. For tubes of practical diameter, satisfactory measurements at such rates can therefore be made only in straight tubes. The gap between the entrance section and test section within the pressure tap will preferably be greater than about 0.020 inch in order to avoid plugging by solids in the mud or other fluid but should always be less than the internal diameter of the tubing. Collar 34 and O-ring 35 on the upstream end of pipe 32 hold the test section in place. An ell or similar fitting 36 which serves to deflect the discharged liquid and permits its recovery is connected to the outer end of pipe 32.

To extend the high shear rate range of the viscosimeter of the invention, two or more interchangeable test sections of different lengths may be provided. Alternatively, entrance and test sections having two or more different internal diameters may be employed to permit measurements at high shear rates over a wider range of viscosities. The apparatus may be used for measurements at low shear rates by providing a long coiled tube of relative large diameter in place of the test and entrance sections. A tube 40 feet long with an internal diameter of 0.0625 inch may be wrapped around the outside of the reservoir, connected to an outlet at the bottom of the reservoir, and covered with a metal shield if desired. By replacing the test section 32 with a plug and discharging the fluid from the reservoir through the coiled tube, data at low shear rates can be obtained. Such data will be accurate only for flow rates covered by the equation:

$$\frac{4VP}{\pi \mu T} \cdot \frac{1}{\sqrt{DD_c}} \leq 10$$

where:
$V$ = volume of fluid collected
$T$ = collection time
$P$ = density of fluid
$\mu$ = viscosity of fluid
$D$ = diameter of the coiled capillary tube
$D_c$ = diameter of coil As pointed out earlier, for high shear rates where the flow is higher than permitted by the above equation, only straight tubes are satisfactory.

The apparatus shown in the drawing is employed by first collecting a sample of the drilling mud to be tested and passing it through a sieve or screen to remove cuttings and other relatively large particles that might otherwise plug the capillary tubing. The screen size employed will depend primarily upon the internal diameter of the capillary tube. Where a tube 0.030 inch in diameter is used, satisfactory results can generally be obtained by passing the mud sample through a Number 120 U.S. Standard Sieve. If a 0.060 inch tube is used, a Number 60 U.S. Standard Sieve will generally be adequate. About 500 to 750 millimeters of the mud will normally be required. After the mud has been screened, it is poured into the cell and the cap is tightened in place. Pipe or hose 16 is connected to a suitable source of air, nitrogen or other gas. Valve 17 is then opened to admit the gas to pressure regulator 18. The pressure regulator is adjusted to obtain the desired pressure. This will normally be about 50% greater than the pressure drop across the test section of the capillary tubing. Bleed-off valve 20 between the regulator and cell may be opened to assure that the regulator is operating properly.

After the cell has thus been brought to the desired pressure, valve 21 on the downstream side of the cell is opened and the fluid is allowed to flow through the capillary tubing until pressure gauge 31 stabilizes. After a constant reading is obtained, a sample of the fluid of known volume is collected by placing a graduated cylinder or similar vessel beneath the outlet fitting 36. The time required to collect the sample, the volume of the sample, the pressure drop on gauge 31, and the capillary tube length and diameter, if both are varied, are recorded. A number of different samples are collected using different cell pressures in order to determine the relationship between viscosity and shear rate over the shear rate range of interest.

As indicated above, the raw data obtained will consist of values for the time required to collect each sample, the volume of each sample, the pressure drop across the capillary tube as each sample was collected, and the length and diameter of the capillary tube employed. The shear rate of the fluid passing through the capillary tube is proportional to the volume of fluid collected per unit time. It can be calculated from the equation:

$$\gamma = \frac{32}{\pi D^3} \cdot \frac{V}{T}$$

where:
$\gamma$ = shear rate
$D$ = diameter of capillary tube
$V$ = volume collected
$T$ = collection time Since the shear rate values for a tube of given diameter can be calculated from the volume of fluid collected and the time required to collect it and are independent of other parameters, a plot of shear rate versus volume for different time values can be prepared for each capillary tube test section to be used. This expedites the use of the apparatus and avoids the necessity for a numerical calculation of the shear rate each time the viscosimeter is utilized.

The viscosity of the fluid passing through the test section of the capillary tube can be calculated by means of the following equation.

$$\mu = K_c \frac{D}{4L} \frac{\Delta p}{\gamma}$$

where:
$D$ = diameter of capillary tube test section
$L$ = length of capillary tube test section
$\Delta p$ = pressure drop across the test section
$\gamma$ = shear rate The quantity $K_c$ in the above equation is a correction factor which normally differs from one by less than 15% and can therefore be omitted in many cases. It is only a function of the parameter $$N = 1 + \frac{[d \ln (\text{viscosity})]}{[d \ln (\text{shear rate})]}$$

for all capillary tubes.

The viscosity is first computed by assuming that $K_c = 1$ and plotted versus the shear rate on a log-log plot. Values of the parameter N can be determined graphically since the expression $d \ln (\text{viscosity}) / d \ln (\text{shear rate})$ is the slope of the resulting curve. The corresponding values for $K_c$ are given by the equation:

$$K_c = \left[ \frac{4N}{1+3N} \right]^N$$

The previously plotted values of the viscosity are multiplied by the respective values of $K_c$ to obtain the true values of the viscosity. The use of these equations in conjunction with the apparatus depicted in the drawing provides a convenient and expedient method for determining the viscosities of drilling muds, fracturing fluids and similar liquids under conditions representative of those encountered in field operations. The equipment employed is capable of withstanding the rough treatment to which oilfield apparatus is normally subjected, is relatively inexpensive, and can readily be employed by field personnel without extensive training. Because of these and other advantages, the apparatus of the invention represents a marked improvement over viscosimeters available in the past.

It will be apparent that various modifications can be made in the apparatus described without departing from the scope of the invention. Since the viscosity of drilling muds and similar fluids varies with temperature, it is advantageous in some instances to provide a jacket or electrical heating coils for maintaining the cell at a temperature above the ambient temperature. In such cases, the use of a piston for applying pressure to the cell has advantages over the use of a gas pressurizing system as shown. Other modifications will suggest themselves to those skilled in the art.

What is claimed is:

1. A viscosimeter for measuring the viscosity of a drilling mud or similar liquid comprising:
    (a) a closed cell for containing a sample of drilling mud or similar liquid;
    (b) means for applying pressure to the liquid contained in said cell;
    (c) an elongated capillary tube including a straight entrance section communicating with said cell and a straight test section which communicates with and is substantially concentric with said entrance section, said entrance section and test section being arranged in end-to-end relationship and separated by a gap less than the internal diameter of said sections; and,
    (d) a gauge communicating with said gap between said entrance section and said test section for indicating the pressure drop in said test section as liquid from said cell is discharged through said entrance and test sections.

2. A viscosimeter for determining the viscosity of a drilling mud or similar liquid at high shear rates comprising:
    (a) a closed test cell for containing a sample of said drilling mud or similar liquid;
    (b) means near one end of said cell for introducing a gas into said cell at a controlled pressure above the liquid contained therein;
    (c) a conduit connected to said cell near the other end thereof;
    (d) a pressure gauge connected in said conduit at an intermediate point therein;
    (e) a straight capillary entrance section extending in said conduit upstream of said pressure gauge;
    (f) a straight capillary test section substantially concentric with said entrance section extending in said conduit downstream of said pressure gauge, the gap between said entrance section and said test section adjacent said gauge being less than the internal diameter of said sections; and,
    (g) means in said conduit for maintaining seals between the inner wall of said conduit and the outer walls of said capillary entrance section and said capillary test section.

3. A viscosimeter for determining the viscosity of drilling mud or similar liquid at high shear rates comprising:
    (a) a closed test cell for containing a sample of said drilling mud or similar liquid;
    (b) means including a pressure regulator for introducing a gas into said test cell above liquid contained therein;
    (c) a conduit connected to said cell for withdrawing liquid therefrom;
    (d) a pressure gauge connected in said conduit at an intermediate point therein;
    (e) a straight capillary entrance section extending in said conduit upstream of said pressure gauge, said entrance section having an internal diameter between about 0.01 and about 0.1 inch;
    (f) a straight capillary test section substantially concentric with said entrance section extending in said conduit downstream of said pressure gauge, the internal diameter of said test section being the same as that of said entrance section and the gap between said entrance and test sections being less than the internal diameter of said sections; and,
    (g) means in said conduit for maintaining seals between the inner wall of said conduit and the outer walls of said capillary test section.

4. A viscosimeter as defined by claim 3 wherein said entrance and test sections have an internal diameter between about 0.025 and about 0.075 inch and said test section is between about 8 and about 16 inches in length.

5. A viscosimeter as defined by claim 3 including means for replacing said entrance and test sections with entrance and test sections of different dimensions.

References Cited

UNITED STATES PATENTS

| | | | |
|---|---|---|---|
| 1,633,352 | 6/1927 | Tate | 73—55 XR |
| 1,962,861 | 6/1934 | Ericson | 73—55 |
| 2,022,578 | 11/1935 | Thomas | 73—55 |
| 3,081,621 | 3/1963 | De Bruyne | 73—55 |

FOREIGN PATENTS 796,850    2/1936    France.

DAVID SCHONBERG, *Primary Examiner.*